UNITED STATES PATENT OFFICE.

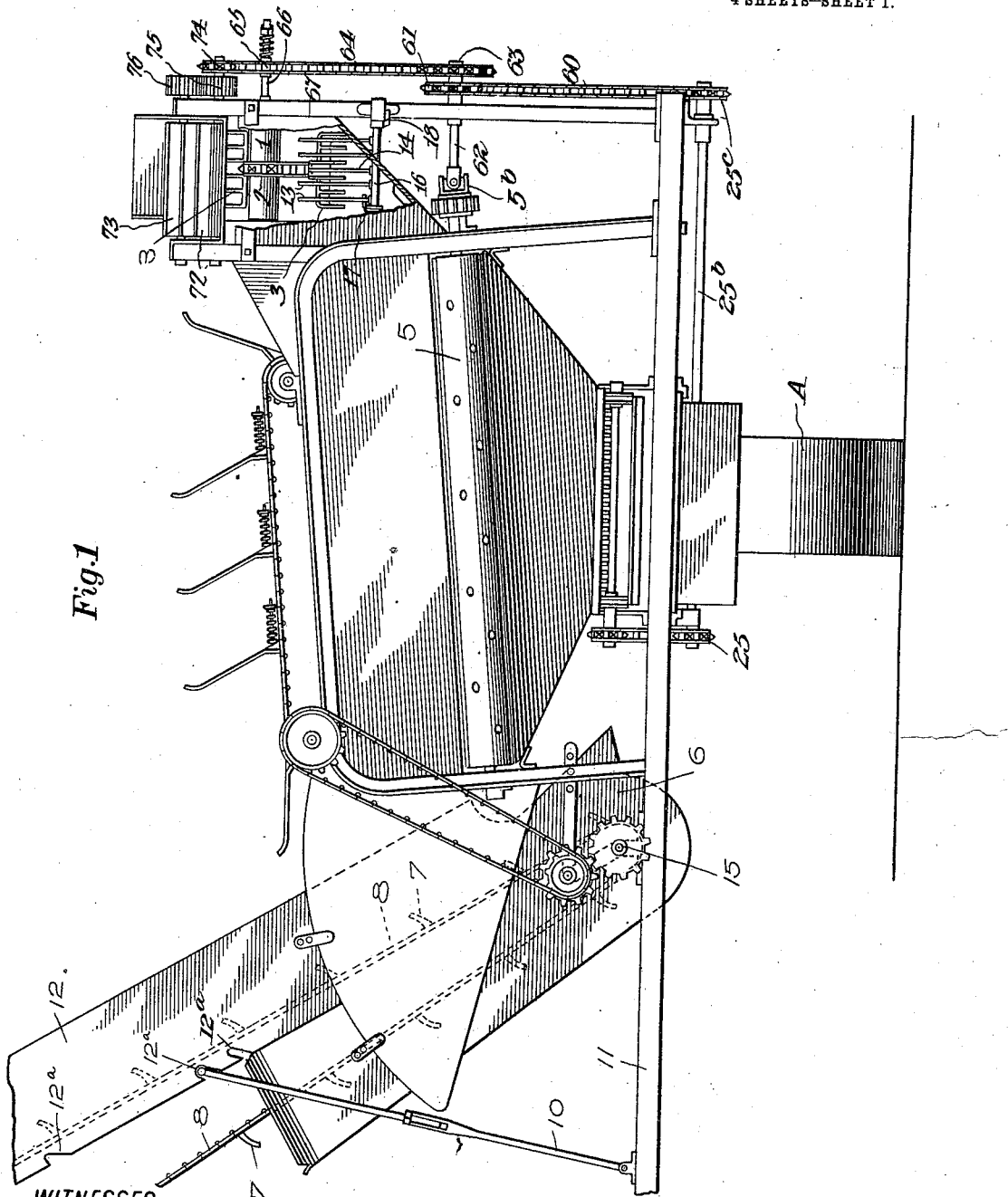

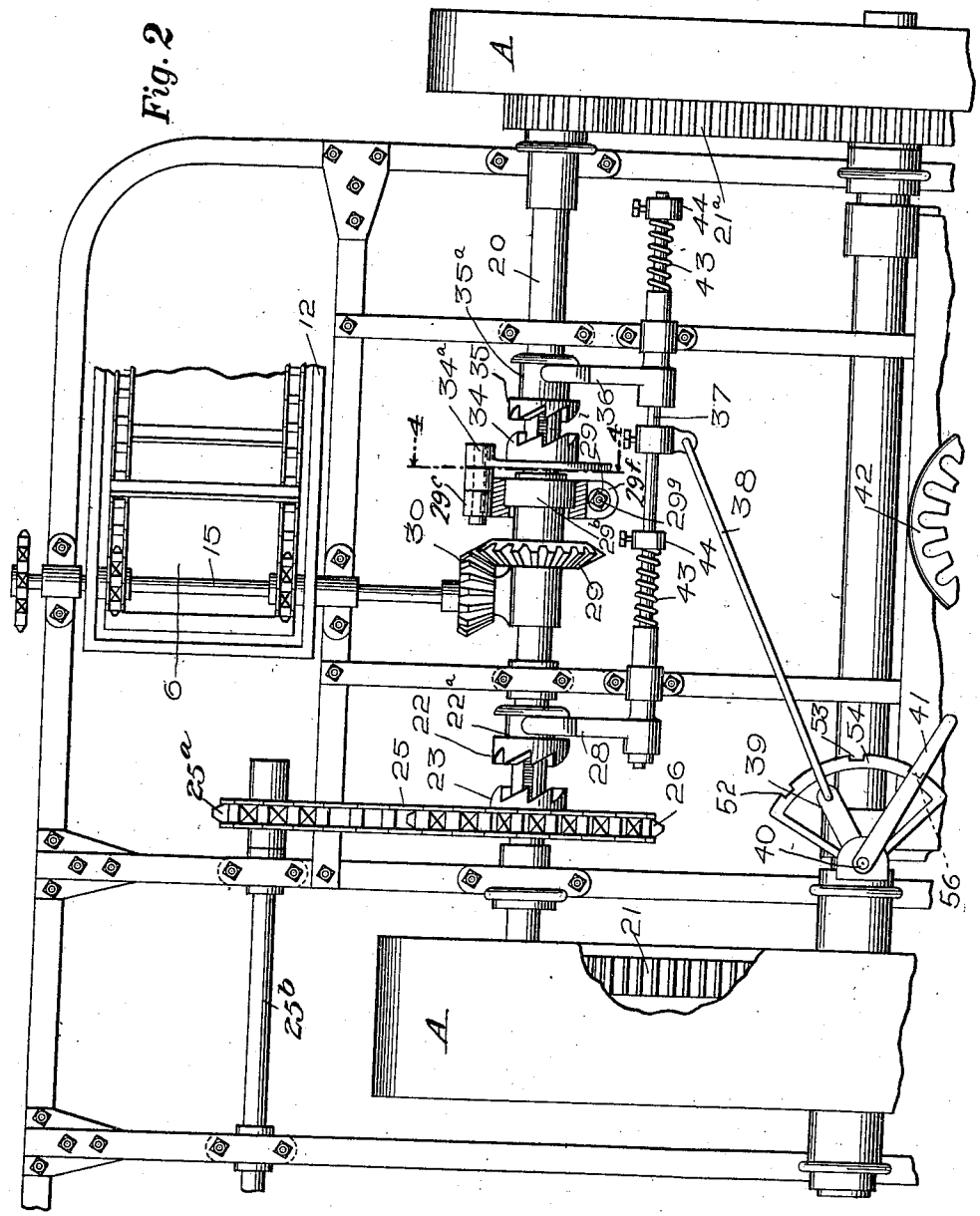

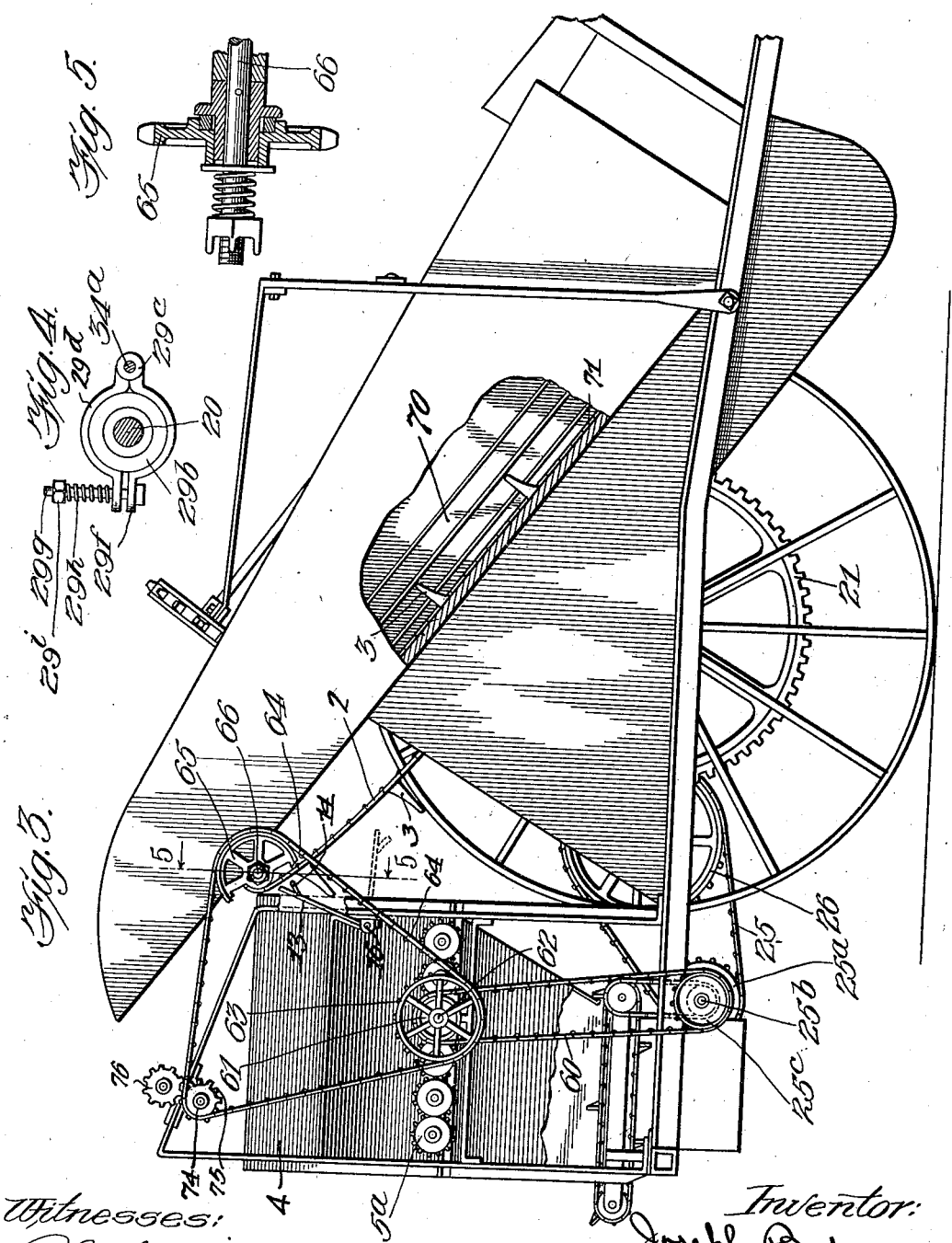

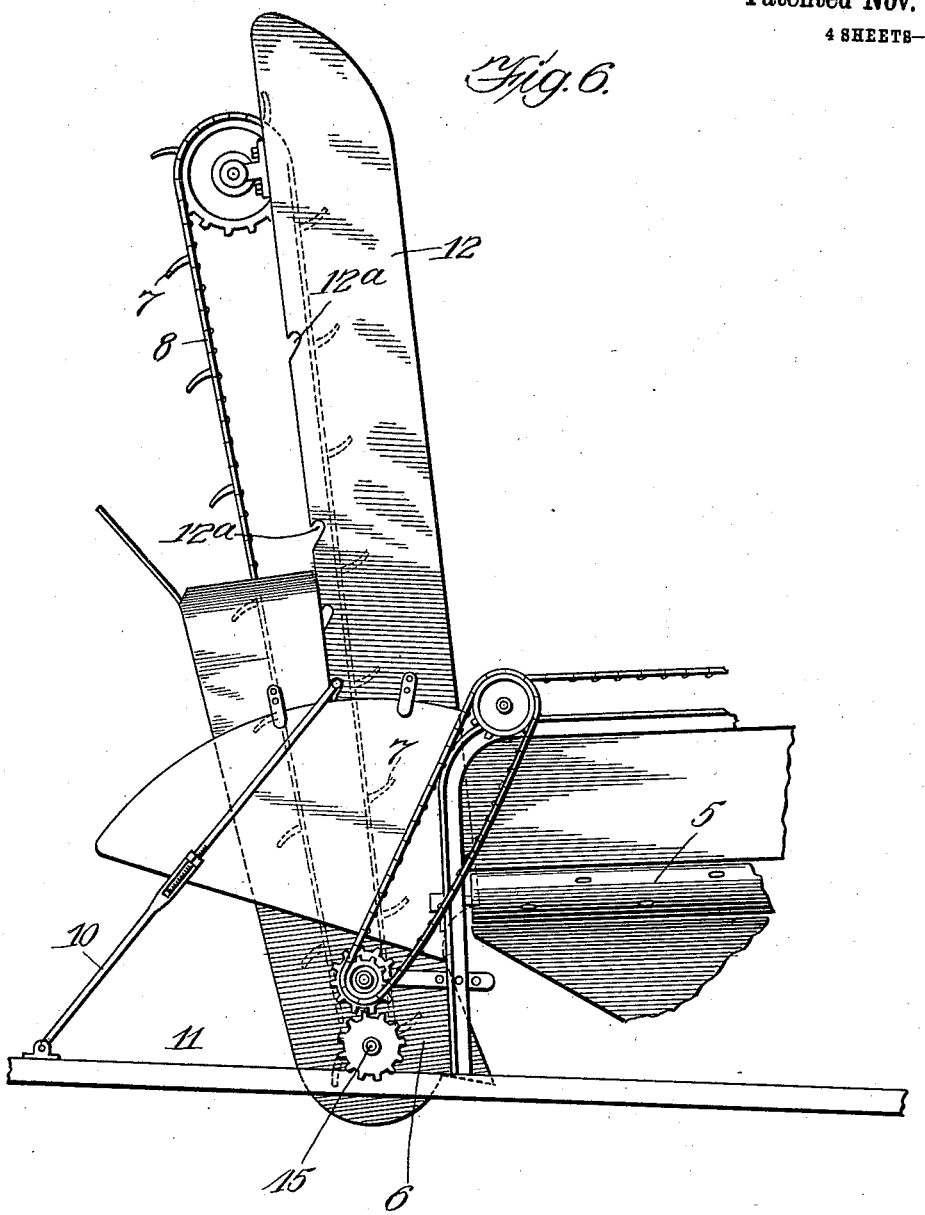

JOSEPH BODA, OF PLANO, ILLINOIS, ASSIGNOR TO THE INDEPENDENT HARVESTER COMPANY, OF PLANO, ILLINOIS, A CORPORATION OF MAINE.

CORN GATHERING AND LOADING MACHINE.

1,008,942.

Specification of Letters Patent. Patented Nov. 14, 1911.

Original application filed March 20, 1909, Serial No. 484,620. Divided and this application filed June 28, 1909. Serial No. 504,785.

*To all whom it may concern:*

Be it known that I, JOSEPH BODA, a citizen of the United States, residing at Plano, in the county of Kendall and State of Illinois, have invented new and useful Improvements in Corn Gathering and Loading Machines, of which the following is a specification, reference being had to the accompanying drawings, forming a part thereof.

This application is a division of my pending application Serial No. 484,620, filed March 20, 1909, for corn gathering machine. This divisional application relates to the means for delivering the husked ears from the machine for loading, and to the connections between the different driving trains.

It relates to the features of construction shown and described as indicated in the claims.

In the drawings:—Figure 1 is a rear elevation of a machine embodying this invention. Fig. 2 is a plan view of the driving trains. Fig. 3 is a partly sectional grainward side elevation of the machine, the casing of the ear detaching or gathering device being broken away the latter being shown in vertical fore-and-aft section. Fig. 4 is a detail section at the line 4—4 on Fig. 2. Fig. 5 is a detail view at the line 5—5 on Fig. 3. Fig. 6 is a detail rear side elevation of the loading elevator shown in position for delivering the corn back into the casing.

It may be understood that the machine which is represented in the drawings comprises means for engaging the stalks as the machine advances over the field, detaching the ears therefrom and conveying them to husking devices by which the husks are stripped from the ears and the ears conveyed for delivery into an elevating apparatus by which they may be discharged for loading, or along the path of the machine, as desired. The drawings do not show the ear-detaching mechanism in detail, and they may be of any familiar construction. Also the means for detaching the husks from the ears are not shown in detail in this application, their position only being indicated sufficiently to show the relation of the several elements to the elevator to which the ears are delivered for final discharge.

The ears after being detached from the stalks are delivered rearwardly over the upper roller, 1, of the ear-elevating mechanism, of which only said rear roller and the elevating device appear in the drawings; said elevating device comprising the chain, 2, and ear-propelling fingers, 3, thereon. One feature of the invention consists in devices provided at the delivery end of the elevator conveying device for stripping from the fingers 3 or conveyer chain 2, ears which may be engaged by the husks, or otherwise, with such fingers. These stripping devices consist of stripping fingers 13 and 14, projecting from a horizontal rock shaft 16, mounted at a distance below the upper or delivery end of the path of the conveyer chain 2, and extending up from said shaft, terminating near the lower side of the chain. The stripping fingers 13, of which there are two at each side of the chain, extend straight from the shaft to a line within the path of the ear-engaging fingers 3 of the conveyer chain, stopping short only so that they may clear the roll, 1, on the driving shaft 66 of said conveyer, in swinging forward to pass under it, as they may be caused to do by ears engaging with them. The stripping finger, 14, however, which stands in the path of the chain, 2—that is, in a fore-and-aft path cutting across the links of the chain,—is deflected at its upper end forward, as seen in Fig. 3,—so that it may not be liable to encounter the cross-bars of the link abruptly by its end, but may, at its end where such encounter would occur, trend onward in the direction of travel of the lower return ply of the chain, so that it will be readily drawn out of engagement with any link which it may encounter. It will be understood that all the stripping fingers, 13 and 14, are held normally in their upstanding position, in which they are shown in Fig. 3, by a spring 17, coiled upon their shaft 16, so as to operate thereon with a tendency to yieldingly resist the forward swinging movement of the fingers, which are stopped against rearward movement beyond the position at which they are shown in Fig. 3, by their tails 18 fast on the shaft 16, stopping against the shaft-bearing. Upon delivery over said roller, 1, the ears fall into the inclined chute, 4, by which they are delivered on to the husking rolls, 5, which extend in downwardly inclined direction transversely of the path of travel of the machine at the rear, as seen in Fig. 1, being at the lower end of said rolls delivered into the elevator casing, 6, where they are engaged by the blades, 7, on the elevator chains, 8, carried up for delivery at the upper end of the conveyer into a wagon which may be traveling alongside the machine for that purpose, in a manner requiring no illustration and not illustrated.

In order to prevent the delivery of the ears from the elevator when so desired, while the machine is turning at the end of a row or around a corner of a field, while the wagon traveling at the outer side of the path of the machine requires time to overtake the delivery end of the elevator, the latter is mounted for swinging upward about the axis of its driving shaft at the lower end, so that the ears elevated by it may fall from its upper delivery end back into the casing of the elevator which incloses the lower return ply of its chain for a sufficient distance from its lower end to present an upwardly open mouth under the upper delivery end of the elevator, as may be understood from Fig. 6, so that the ears will accumulate in the elevator casing during the short time occupied by the machine in turning, ready to be carried up for delivery into the wagon when, after the turn is completed, the elevator is lowered to customary delivering position. For such adjustment of the elevator, it is only necessary that its case, 6, should be pivotally mounted about the axis of the driving shaft, 15, at the lower end and provided with means for holding it at any inclined position to which it may be adjusted, said means consisting in two members, 10, pivoted at the lower end on a transverse bar, 11, of the frame, and at the upper end engaged in notches, 12$^a$, in the under side of the elevator frame bar, 12, such notches being positioned suitably for holding the elevator in at least two positions; one for delivering into the wagon, and the other for delivering back into the casing of the lower ply, as described. A wider range of adjustment, however, may be provided to permit the elevator to be lowered so as to deliver the corn into a lower wagon or on to the ground without danger of shelling the corn by the long drop which it would have from the high position to which the elevator may necessarily be lifted for delivering the corn on the top of the load already accumulated in the wagon.

A feature in this invention consists in the adaptation of the structure for disconnecting the mechanism for operating the snapping rolls and elevator connected therewith while continuing the operation of the ear-delivering elevator so that the machine may be emptied while traveling away from the field or from the stalks last stripped of their ears without the needless expenditure of power necessary for operating the snapping rolls. For this purpose, the driving train is constructed and arranged as will now be described.

The main power shaft, 20, is driven by pinions at its opposite ends meshing with gears, 21, 21$^a$, on the traction wheels respectively. Coöperating clutch members, 22 and 23, communicate power from the shaft, 20, by means of a chain, 25, passing around a sprocket wheel, 26, rigid with a clutch member, 23, and around a sprocket wheel, 25$^a$, fast on the shaft, 25$^b$, which drives the gathering and husking devices as hereinafter described. The clutch member, 22, is feathered and mounted for sliding on the shaft, 20, while the member, 23, is loose thereon, a shipping fork, 28, being engaged in an annular groove, 22$^a$, in the hub of the clutch member, 22, for sliding said clutch member on the shaft into and out of engagement with the member, 23. The ear-delivering elevator mechanism is driven by a bevel-gear, 29, on the shaft, 20, meshing with a bevel-gear, 30, on a fore-and-aft elevator driving shaft, 15. The gear, 29, is frictionally connected, as hereinafter described, with a clutch member, 34, loose on the shaft, 20, which coöperates with a companion clutch member, 35, feathered for sliding on the shaft, 20, and is operated in said sliding movement by a shipping fork, 36, engaging with a wide annular circumferential groove, 35$^a$, in the hub of the clutch member, 35. The frictional connection of said clutch member, 34, with the bevel-gear, 29, is effected by providing, rigid with said bevel gear, a cylindrical flange or hub, 29$^b$, which is encompassed by a two-part collar, whose two parts, 29$^c$ and 29$^d$, are pivoted together at one side for closing upon said cylindrical flange or hub, and at the same point pivoted to an eccentrically projecting arm, 34$^a$, of the clutch member, 34. The two parts, 29$^c$ and 29$^d$, of the clamp collar are each provided with a radial extension, 29$^f$, which are connected by a bolt, 29$^g$, fast in one of said projections and extending through the other, a spring, 29$^h$, being coiled around the projecting end of the bolt and stopped by the tension nut, 29$^i$, on the end thereof for regulating the pressure by which the two-part collar is clamped for frictional engagement upon the flange or hub, 29$^b$. Both the shipping forks, 28 and 36, are fast on a shaft, 37, mounted for sliding transversely of the line of travel, operated in said sliding movement by a link, 38, connected with a lever arm, 39, of a vertical rock shaft, 40, which has a hand lever, 41, within reach of a driver on a seat, 42. Springs, 43, on the shaft, 37, react between stops, 44, on the shaft and the bearings of said shaft tending to hold the shaft at position for keeping both of the clutches disengaged, as seen in Fig. 2.

When the lever, 41, is operated for sliding the shaft 37 against the resistance of its springs, the clutch member, 22, is immediately moved toward its companion member, but the fork, 36, travels in the wide slot, 35$^a$, of the member, 35, without moving said clutch member, 35, but the clutch member, 22, is normally distant from its companion member on the shaft 20 a distance greater than that which separates the two members, 35 and 34, enough to compensate for the difference in the width of the slots in the two clutch members, 35 and 22, respectively, so that the two clutches come into engagement at the same time, and both parts of the mechanism start together. But in operating the lever, 41, for disengagement, the clutch member, 22, is immediately taken out of engagement with its companion member, such disengagement being effected while the lever, 41, is moved from the notch, 52, to the notch, 53, in the segment, 54, and when the detent on the lever, 41, is engaged with the notch, 53, the gathering and husking mechanisms are out of action while the ear-delivering elevator is in action. In order to take the latter out of action, the lever, 41, is moved to the position shown in Fig. 2, where its detent is engaged with the notch, 56, of the segment, 54.

The frictional connection from the bevel-gear, 29, to the clutch member, 34, permits the ear-delivering elevator mechanism to slip when the elevator becomes clogged or overloaded.

The particular construction of the ear detaching and husking mechanism is not claimed in this application but the general structure may be described for the purpose of understanding its relation to the driving train above described. From a sprocket wheel, 25$^c$, on the shaft, 25$^b$, a chain passes to a sprocket wheel, 61, on the transverse shaft, 62, suitably journaled at the rear of the traction wheels A, A. The second sprocket wheel, 63, on said shaft communicates power by means of a chain, 64, to a sprocket wheel, 65, on the upper shaft, 66, of the conveyer chain, 67, by which the ears detached from the snapping rolls hereinafter mentioned, are carried up rearwardly for delivery downward into the hopper, 4, in which are the husking rolls, 5, already mentioned. These husking rolls are geared together in series from an intermediate one so that they revolve alternately in opposite directions as may be understood from the representation of the gears, 5$^a$, in Fig. 3, said intermediate roll having its shaft connected by toggle joint, 5$^b$, with the shaft, 62, above mentioned. The snapping rolls may be understood as being of familiar construction and location that is inclined upward from front to rear (as may be understood from Fig. 3) in which one of the rolls, 70, is shown where the trough 71 of the ear delivering device is broken away. Any customary means for communicating power to the snapping rolls may be employed. No specific means is shown.

It frequently happens that the upper end of a stalk is broken off with an ear when the stem of an ear is tougher than the stalk. Such stalk ends being impelled endwise up along the inclined snapping rolls and projected with some momentum rearward from the top of the conveyer, 2, should, if possible, be separated from the ears and broken off from any ear or ears which may still be attached to them. For that purpose, there are mounted at a position a little rearward from the upper delivery end of the conveyer, 2, a pair of stalk-ejecting and ear-detaching or snapping rolls, 72 and 73, mounted upon a suitable extension of the frame with their axes horizontal and transverse to the direction of travel, and their meeting line in such position that the stalks projected endwise from the top of the snapping roll elevator will be thrust against them and be drawn between them, causing any ears which may be so attached to them to be snapped off at the forward side and dropped into the hopper, 4, while the stalks are ejected endwise rearward to the ground. These rolls, 72 and 73, may be driven by any convenient connection with the other portions of the mechanism, as by the chains, 64, which drive also the conveyer as above described.

I claim:—

1. In a corn-gathering machine, in combination with means for detaching the ears from the stalks and the husks from the ears, an elevator comprising a casing constituting a receptacle into which the ears are delivered from the husking device, said casing being extended up at the under or back side of the elevator, and open at the upper end, such elevator casing being mounted for rocking about an axis near its lower end, and adapted to be swung to position at which the delivery side of the upper end of the elevator overhangs said open mouth of the casing, and means for releasably securing the casing at such position.

2. In a corn-gathering machine, in combination with gathering and husking mechanisms, and an ear elevating and delivering mechanism, a power shaft from which all said mechanisms derive movement; a clutch for engaging the gathering and husking mechanisms with the power shafts; another clutch for engaging the ear elevating and delivering mechanisms with said shaft; shipping devices for operating said clutches; a hand lever for actuating the shipping devices; the clutch for connecting the ear elevating and delivering mechanisms having its movable member provided with a wide peripheral groove, the shipping device therefor comprising a fork for engaging said groove narrower than the groove, the shipping device for the other clutch comprising a fork for engaging its movable member proportioned so as to be engaged therewith substantially without lost motion; the movable members of the two clutches being positioned with respect to their operating forks for simultaneous movement into engagement with their respective coöperating members after the fork of the second-mentioned clutch has moved in the wide groove to the limit thereof in the direction for moving said member to its engagement.

3. In a corn gathering machine, in combination with a power train, gathering and husking mechanisms and an ear elevating and delivering mechanism, separate trains for actuating the gathering and husking mechanisms on the one hand and the ear elevating and delivering mechanisms on the other hand; clutches connecting said mechanisms to the power train and a single operating lever for both clutches; operating connections from the hand lever to the clutches; said operating connections of the elevator operating clutch having means for lost motion for delaying the disengaging movement of that clutch relatively to that of the other.

4. In a corn-gathering machine, in combination with gathering and husking mechanisms and an ear elevating and delivering mechanism, a power shaft from which said mechanisms derive movement; a clutch for engaging the gathering and husking mechanisms with the power shaft; another clutch for engaging the ear elevating and delivering mechanisms with said shaft; shipping devices for operating said clutches; a lever for operating the shipping devices, one of said clutches having its movable member provided with a peripheral groove for the engagement of the shipping device therewith which is wider than the engaging part of said shipping device, whereby there is caused lost motion between the two, the other clutch having its shipping device engaged substantially without loss of motion; the said movable members of the two clutches being positioned relatively to each other and to their respective shipping devices and their respective coöperating members, so that at the limit of the movement of the shipping devices in the direction for disengagement, the clutch member having no lost motion is withdrawn from its coöperating member farther than the other to the extent of the lost motion of said other clutch member.

5. In a corn-gathering machine, in combination with snapping rolls and an elevator for delivering the plucked ears to succeeding mechanism; a hopper which extends under the delivery end of said elevator; a yielding stripper and a spring which holds it normally upstanding within the hopper under said delivery end in the path of the ear-propelling devices of the elevator.

6. In a corn-gathering machine, in combination with an elevator for delivering the plucked ears to a succeeding mechanism; a hopper which extends under the upper delivery end of such elevator; yielding strippers and means holding them yieldingly upstanding within the hopper under said delivery end in the path of the ear-propelling devices of the elevator, certain of said yielding strippers standing in the fore-and-aft plane of the conveyer chain of the elevator and having the upper end curved forward trending approximately in the direction of travel of the under or return ply of said chain.

7. In a corn-gathering machine, in combination with snapping rolls and an elevator for delivering the plucked ears to the succeeding mechanism; a hopper which is overhung at one side by the upper delivery end of the elevator for receiving the ears, and a pair of rollers mounted above the hopper at the opposite side near the level of the upper end of the elevator for engaging stalks projected from the elevator, and means for rotating said rollers in a direction such that their proximate sides move onward in the direction of such projection for discharging the stalks beyond the hopper.

8. In a corn-gathering machine, in combination with snapping rolls and an elevator for delivering the plucked ears to the succeeding mechanism; a hopper which is overhung at one side by the upper delivery end of the elevator for receiving the ears; stalk-engaging devices adapted for detaching ears from stalk fragments which may have been broken off with the ear mounted above the hopper in position to receive stalk fragments discharged from the upper end of the elevator.

In testimony whereof I have hereunto set my hand, in the presence of two witnesses, at Chicago, Illinois, this 10th day of June, A. D. 1909.

JOSEPH BODA.

In the presence of—
M. GERTRUDE ADY,
J. S. ABBOTT.

Copies of this patent may be obtained for five cents each, by addressing the "Commissioner of Patents, Washington, D. C."